March 1, 1955

H. R. DENTON 2,702,972

MACHINE FOR USE IN WRAPPING ARTICLES
WITH THERMOPLASTIC MATERIAL

Filed April 20, 1953

INVENTOR.
HARVEY R. DENTON
BY
ATTORNEYS

March 1, 1955

H. R. DENTON 2,702,972

MACHINE FOR USE IN WRAPPING ARTICLES
WITH THERMOPLASTIC MATERIAL

Filed April 20, 1953

INVENTOR.
HARVEY R. DENTON

BY
Boykin, Mohler & Beckley

ATTORNEYS

United States Patent Office 2,702,972
Patented Mar. 1, 1955

2,702,972

MACHINE FOR USE IN WRAPPING ARTICLES WITH THERMOPLASTIC MATERIAL

Harvey R. Denton, Oakland, Calif.

Application April 20, 1953, Serial No. 349,829

3 Claims. (Cl. 53—98)

This invention relates to a machine for packaging elongated articles, such, for example, as celery, asparagus, etc., in which a band or strip of material is wrapped about a group of such articles when they are in substantially side by side relation, and secured to itself for holding such articles in a bundle.

In copending application, Serial No. 291,009, filed by me on May 31, 1952, of which this application is a continuation-in-part, apparatus was disclosed for use in packaging articles in substantially the same manner as in the present instance.

An object of the present invention is the provision of apparatus for use in packaging elongated articles, as above mentioned and in which the securement of thermoplastic packaging material together about said articles is by a heat sealing method in which a section of a band is rendered hot and soft enough to soften another section that is pressed thereagainst and to fuse with said last named section purely by transfer of heat from the originally softened section and a backing band secured thereto.

Another object of the present invention is the provision of a machine for packaging elongated articles such as celery, asparagus and the like by a heat sealing step that includes the cutting off of portions of a strip of thermoplastic material by the same heating element that is employed to render the material tacky.

An additional object is the provision of a machine for use in packaging elongated articles such as celery, asparagus and the like and by employment of heat and thermoplastic material sealed by such heat without injury to the articles being wrapped.

In connection with the present invention, it is well known that articles or products such as celery, asparagus and other elongated products, vary substantially in size and shape and length, hence the use of a uniform preformed container for them does not, in all instances, produce a pleasing appearance. Furthermore, such products should be exposed so they can be seen from all sides, and to do this and at the same time provide a label on the product to identify its origin without injury to the product or products, presents a problem. The use of thermoplastic material in itself is unsatisfactory, since the heat from a heating element, if pressed against the produce will injure it, assuming a backing surface were provided, which is not, in these instances provided by anything except the articles, and they are too irregular in any event, to use as a support.

The present machine enables the products to be wrapped, sealed and labeled, and to cut off the wrapping material, in substantially no more time than is required to draw a section of a strip of thermoplastic material around a bundle of articles.

Other objects and advantages will appear in the description and in the drawings.

In the drawings,

Fig. 3 is an enlarged fragmentary sectional view through the heating element and the support therefor with the said element in a position for heating the thermoplastic material and for cutting of a section thereof at the same time.

Figure 1:
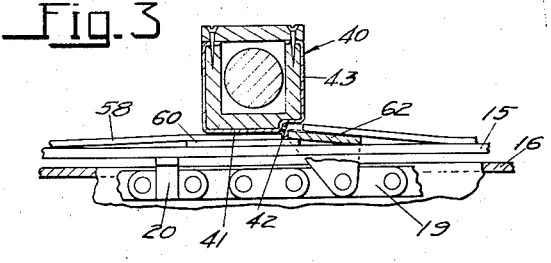
Fig. 1 is a side elevational view of the machine, partly broken away to show inside structure, and showing a head or stalk of celery in a position to be wrapped, with certain parts shown in Fig. 4 omitted for clarity.

In detail, the machine illustrated by the drawings comprises, a frame 1 supporting a pair of horizontally disposed and horizontally spaced pulleys at the upper end thereof, which pulleys are respectively secured to shafts 2, 3. Said shafts are supported at their ends in bearings that, in turn, are secured to frame 1.

The pulley on shaft 2 is in two sections 4, 5 (Fig. 2) spaced apart to enable a sprocket chain 6 to extend from a sprocket wheel 7 (Fig. 4) on a sleeve or hollow shaft 8, to and over a sprocket wheel 9 that is secured on a driven shaft 10. The said sleeve or hollow shaft 8 is rotatable on shaft 2, and the shaft 10 is also rotatable in bearings supported on frame 1.

The pulley on shaft 3 may also be in two sections 11, 12. It is obvious, however, that a full or single pulley could be used in place of the sections, if desired, where compactness and lightness were of no consideration.

An endless woven wire conveyor 15 extends over the pulleys, and the upper rim or stretch of said conveyor is preferably supported on a horizontal table 16 that is rigid with the frame.

At the ends of shafts 2, 3, and preferably inwardly of the horizontal edges of the conveyor are sprocket wheels 17 (on shaft 2) and sprocket wheels 18, on shaft 3. Each of sprocket chains 19 extend over the corresponding wheels 17, 18 so that the rotation of shaft 2 by the chain 6 will drive the pulleys counterclockwise, as seen in Fig. 1. The conveyor is secured to said chains by lugs 20 (Fig. 3) at spaced points along the latter.

Shaft 10 has a sprocket wheel 22 (Fig. 2) secured thereto, and which wheel is connected by a sprocket chain 23 (Fig. 1) with a sprocket wheel 24 that, in turn is driven through a gear box 25 by a motor 26.

Inasmuch as the upper run of the conveyor is intended to be intermittently actuated for carrying the wrapping material for celery and the like from right to left (as seen in Fig. 1) a clutch generally designated 27 is provided on shaft 2.

Clutch 27 may be a conventional single revolution clutch of the type in which clutch rollers are moved into driving contact by a spring (not shown) when a revolution of a stop pin 28 (Fig. 4) is permitted. When the revolution of the stop pin is interrupted and the pin is held against movement about the axis of shaft 2, the shaft 2 and the sleeve are disconnected, but when pin 28 is released, the shaft 2 and sleeve 8 will be connected so that rotation of sleeve 8 will cause similar rotation of shaft 2, and consequently, movement of the conveyor.

Figure 4:
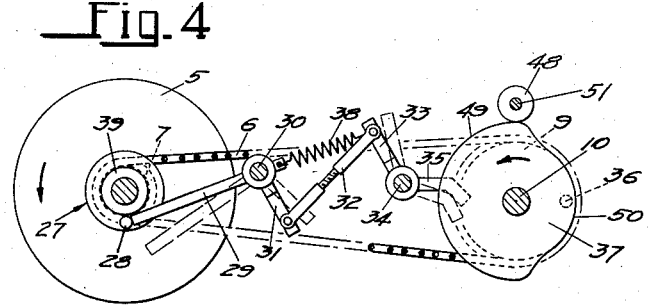
Fig. 4 is a fragmentary detached, part sectional view of the control mechanism for the heater and conveyor means.

The means for holding pin 28, and thus disconnecting shaft 2 from being driven by sleeve 8, comprises one arm 29 of a crank that is pivotally supported at 30 (Fig. 4). The other arm 31 of said crank is pivotally connected to one end of an extensible connecting rod 32. The other end of rod 32 is pivotally connected with the end of an arm 33 of a second crank, the latter being pivotally supported on a pivot 34. The other arm 35 of said second crank is in the path of a pin 36 that projects from a side of cam 37. Cam 37 in turn is secured to the driven shaft 10.

A spring 38 tends to hold arm 35 in the path of the pin 36 at all times so that said pin will rock said second crank in passing said pin.

In operation, upon pin 36 engaging the arm 35, it will cause rotation of crank arms 35, 33 clockwise (as seen in Fig. 4) thus causing counterclockwise movement of crank arms 29, 31. This will result in arm 29 moving out of holding relation to stop pin 28, thereby connecting the shaft 2 and sleeve 8 for rotation of said shaft with said sleeve, and causing the conveyor to be driven from right to left (as seen in Figs. 1, 2).

The ratio is such that pulley 5 and shaft 2 will make one full revolution to each half revolution of shaft 10, the reason for which will later appear.

For the present, it is sufficient that as soon as pin 36 actuates arms 35 to swing arm 29 away from pin 28, the shaft 2 and sleeve 8 will automatically make one full revolution and pin 28 will then engage the end of arm 29, which will result in disconnecting shaft 2 and sleeve 8 until the pin 36 again strikes the arm 35. As soon as pin 28 passes the end of arm 29 the latter will ride on the clutch trip cam 39 in the path of stop pin 28.

Figure 2:
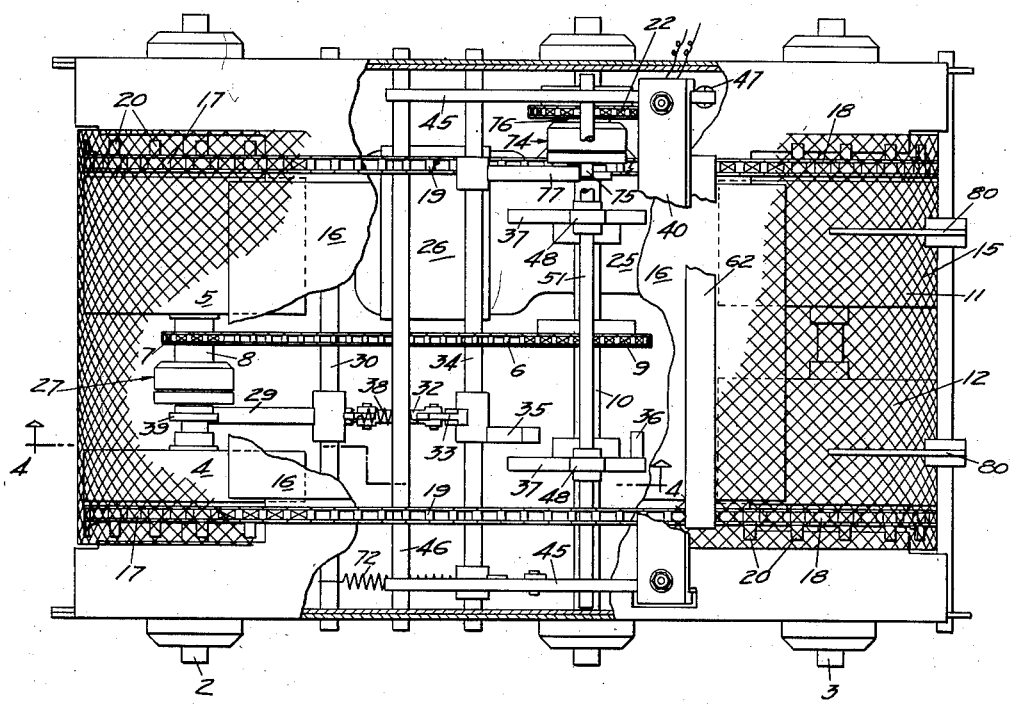
Fig. 2 is a top plan view of the machine of Fig. 1, also partly broken away.

Extending transversely across the upper run of the conveyor at the right hand end of the latter, as seen in Figs. 1, 2, is a heating bar or element 40. This element 40 is provided with a flat underside at 41, the right hand corner of which is cut away to form a step 42 that is elevated relative to surface 41. The under surface of said element, which includes the surface 41 and step 42, is covered with a glass fabric 43 or with any other suitable material that is resistant to injury from heat, and that will not stick to regenerated cellulose, chlorinated rubber or rubber hydrochloride, when such plastic is brought into contact with the material and is brought to the melting point.

The element 40 is secured at its ends to vertical bars 44 that depend therefrom and that, in turn, are secured to one of the corresponding ends of generally horizontally extending arms 45 (Figs. 1, 2). The other corresponding ends of arms 45 are supported for swinging on pivot 46, and a spring 47 at the ends of the arms 45 that are nearest the element 40 functions to yieldably hold cam followers 48 on shaft 51 that extends between arms 45 against the upper side of each cam 37.

There are preferably two cams 37, one of which carries the pin 36 already mentioned. Cams 37 are identical, except for pin 36, and are positioned to give corresponding simultaneous movement to the cam followers 48, with the result that the element 40 is raised and lowered by its ends so as to be parallel with the upper side of the conveyor.

In the position of cams 37 shown in Fig. 4, the cam followers 48 are just ready to descend from the high side 49 of each cam to the low side 50. Said high side extends half way around each cam and the low side extends around the other half. The pin 28 on the clutch trip cam 39 is being held by the arm 29. Pin 36 is a half revolution away from the arm 35 and as shaft 2 makes one full revolution for each half revolution of shaft 10, as soon as cam follower 48 moves downwardly, the heater 40 will be brought down to engage whatever is on the conveyor, and it will stay in such engagement until one half revolution of the cam 37 is completed, at which time the cam follower will be elevated to raise the heater, and the arm 29 will release the pin 28 permitting the shaft 2 to make a full revolution, when the shaft 2 will stop. The pressure of the element 48 against whatever is on the conveyor can be regulated by the tension of each spring 47, if two springs are used, or by a single spring if only one is used.

The frame 1 supports a roller 55 that may carry a roll 56 of rubber hydrochloride, commonly known as "Pliofilm" or whatever thermoplastic sheet material is used, any suitable adjustable brake 57 may be used to maintain the desired tension on the web 58 of such material.

This web 58 preferably extends around an idler roller 59 and then over the end of the conveyor that is carried on pulley sections 11, 12 and to the upper side of the upper run of said conveyor.

The web or strip 58 has secured to its underside equally spaced bands 60 of cardboard that extend transversely across the web or strip of thermoplastic material.

The trailing marginal portion of each band 60 (Fig. 3) is unsecured to the thermoplastic material, with the result that horizontal blades 62 secured to the chains 19 and extending across the outer surface of the woven wire conveyor can slip between the trailing marginal portion of each band 60 and the thermoplastic material as the conveyor is actuated, thereby drawing the strip or web 58 from the roll 56. These blades 62 are slightly tilted transversely thereof, as seen in Fig. 3 so as to be quite positive in their engagement with each band 60, and the spacing between blades 62 may be substantially the same, or slightly more than the spacing between bands 60.

The timing between the conveyor 15 and the movement of heating element 40 is such that each band 60 and blade 62 will stop directly below the element 40 and when the element descends, the portion of the blade that laps the bands 60 will be received in the step 42 while the surface 40 will overlie the band and the portion of the strip 58 that is over said band.

Inasmuch as the plastic material is adhered to the band 60, it will remain adhered even when tacky, but the plastic material will adhere to neither the heating element nor to the blades 62. Instead, the application of sufficient heat to the plastic material that overlies the band 60 to make that portion "tacky" will complete separate the plastic material along the blade so that the section of strip 58 ahead of each band 60 including said band, will be separated from the strip 58 that follows the band. By this arrangement, it is not necessary to employ a knife, with its attendant difficulties of becoming dull, etc. in order to cut off the desired sections of the strip.

In actual practice, as soon as the strip 58 is advanced by the conveyor, the operator places a stalk of celery 65 (Fig. 1) on the leading end of the strip before such leading end has been separated from the rest, and wraps such leading end about the stalk. This act is facilitated by reason of the fact that as the wrapping operation is performed the trailing end is held by the heater, thus enabling the operator to obtain a relatively tight wrap on the celery (or whatever is being wrapped).

Figure 5:
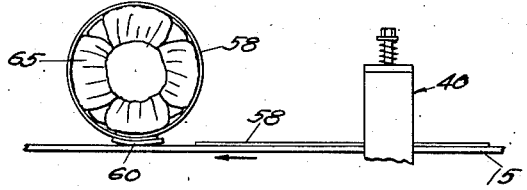
Fig. 5 is a detached side elevation view of the final wrapping step in forming the package.

As soon as the heating element 40 is elevated, the stalk and the plastic material wrapped therearound are rolled over the band 60 (Fig. 5) and as the portion of the plastic material over said band is tacky and hot, it will fuse with the portion of the wrapper that contacts it, and that completes the wrapping step.

From the foregoing, it is seen that the heating step that makes the plastic wrapper tacky where the latter is over the band 60 also functions to cut off the leading section of the plastic strip where the heater projects to one side of the band. The band itself plays an important part, for without it the plastic material would virtually dissolve, as it does over the blade 62. The heating element, as already described, also functions to hold the leading section or wrapper to facilitate drawing such section taut about the article that is being wrapped.

The use of the woven wire conveyor permits moisture to be present without affecting the operation of the machine and the handling of the plastic material, which would not be possible were a smooth surface belt used, or one in which the moisture would not immediately drain from the supporting surface.

In operating the machine, a foot pedal 67 is provided (Fig. 1). This pedal is connected by a rod 68 with an arm 69 of a crank. The crank is pivotally supported at 34 and the other arm 71 is connected by a spring 72 with pivot 30. Thus pedal 67 is yieldably held in an elevated position and the crank is returned to the full line position shown in Fig. 1 after pressure of the foot has moved the pedal to the broken line position 73 and the foot pressure has been removed.

A clutch, generally designated 74 (Fig. 2) is exactly like clutch 27, having a stop pin 75 that is obstructed by arm 77 rigidly secured to pivot 34 until such arm is elevated by pressing on the foot pedal.

Upon pressing on said pedal and immediately thereafter releasing such pressure, the machine will perform the cycle in that sleeve or hollow shaft 76 (Fig. 2) on which one of the clutch elements is secured is constantly rotating, and as soon as the pin 75 is released by actuation of the foot pedal, the shaft 10 will make a full revolution before it is again stopped by the arm 77 (the latter moving back into the path of pin 75 as soon as foot pressure on the pedal is released).

It will also be noted that guides 80 are provided adjacent pulleys 11, 12 the arcuately formed edges of which conform to but are spaced slightly from the outer surface of wire conveyor 15 for substantially the length of conveyor 15 that bears on pulley 11, 12. Said spacing is just sufficient to allow strip 58 with bands 60 to pass between guides 80 and conveyor 15. Therefore, guides 80 hold strip 58 next to conveyor 15 and facilitate the engagement of blades 62 with bands 60.

It is seen that the present machine does not require the making of any adjustment for various lengths of wrappers since the bands 60 may be spaced apart varying distances and the blade 62 will automatically move the wrapping material to the point where the blade is below the heater.

I claim:
1. In a wrapping machine for supporting and for mov- ing a horizontally disposed strip of thermoplastic material having bands secured to the underside thereof and extending transversely of the length of such strip in one direction longitudinally of said strip; a horizontally extending conveyor for supporting said strip lengthwise thereon with one of said bands against said conveyor, a heating element in elevated position above said conveyor and above such strip and extending transversely thereacross, means supporting said element for intermittent reciprocatory movement downwardly against such strip when the latter is on said conveyor and back again to its elevated position, means for intermittently moving said conveyor and strip in said direction when said element is in said elevated position, means for moving said element into engagement with said strip during the interval between movement of said conveyor and strip, and means for positioning each such band with the strip thereover directly below said element when said element is spaced above said strip and band for engagement of the portion of said strip that is directly over said band with said element when the latter is moved downwardly.

2. In a wrapping machine for supporting and for moving a horizontally disposed strip of thermoplastic material having bands secured to the underside thereof and extending transversely of the length of such strip in one direction longitudinally of said strip; a horizontally extending conveyor for supporting said strip lengthwise thereon with one of said bands against said conveyor, a heating element in elevated position above said conveyor and above such strip and extending transversely thereacross, means supporting said element for intermittent reciprocatory movement downwardly against such strip when the latter is on said conveyor and back again to its elevated position, means for intermittently moving said conveyor and strip in said direction when said element is in said elevated position, means for moving said element into engagement with said strip during the interval between movement of said conveyor and strip, and means for positioning each such band with the strip thereover directly below said element when said element is spaced above said strip and band for engagement of the portion of said strip that is directly over said band with said element when the latter is moved downwardly, said means for positioning said band comprising a member on said conveyor projecting upwardly therefrom for engaging said band.

3. In a wrapping machine for supporting and for moving a horizontally disposed strip of thermoplastic material having bands secured to the underside thereof and extending transversely of the length of such strip in one direction longitudinally of said strip; a horizontally extending conveyor for supporting said strip lengthwise thereon with one of said bands against said conveyor, a heating element in elevated position above said conveyor and above such strip and extending transversely thereacross, means supporting said element for intermittent reciprocatory movement downwardly against such strip when the latter is on said conveyor and back again to its elevated position, means for intermittently moving said conveyor and strip in said direction when said element is in said elevated position, means for moving said element into engagement with said strip during the interval between movement of said conveyor and strip, and means for positioning each such band with the strip thereover directly below said element when said element is spaced above said strip and band for engagement of the portion of said strip that is directly over said band with said element when the latter is moved downwardly, said conveyor being of wire mesh material and said means for positioning said band comprising a strip of metal extending across said conveyor and having an edge adapted to engage over the trailing edge of said band.

References Cited in the file of this patent
UNITED STATES PATENTS

| 1,792,878 | Wagner | Feb. 17, 1931 |
| 2,475,617 | Irmscher | July 12, 1949 |
| 2,655,776 | Bennett | Oct. 20, 1953 |